April 28, 1970 J. E. GUTRIDGE 3,508,500
BRACKET ARRANGEMENT FOR SECURING CARGO CONTAINERS ON VEHICLES
Filed May 24, 1968 3 Sheets-Sheet 3
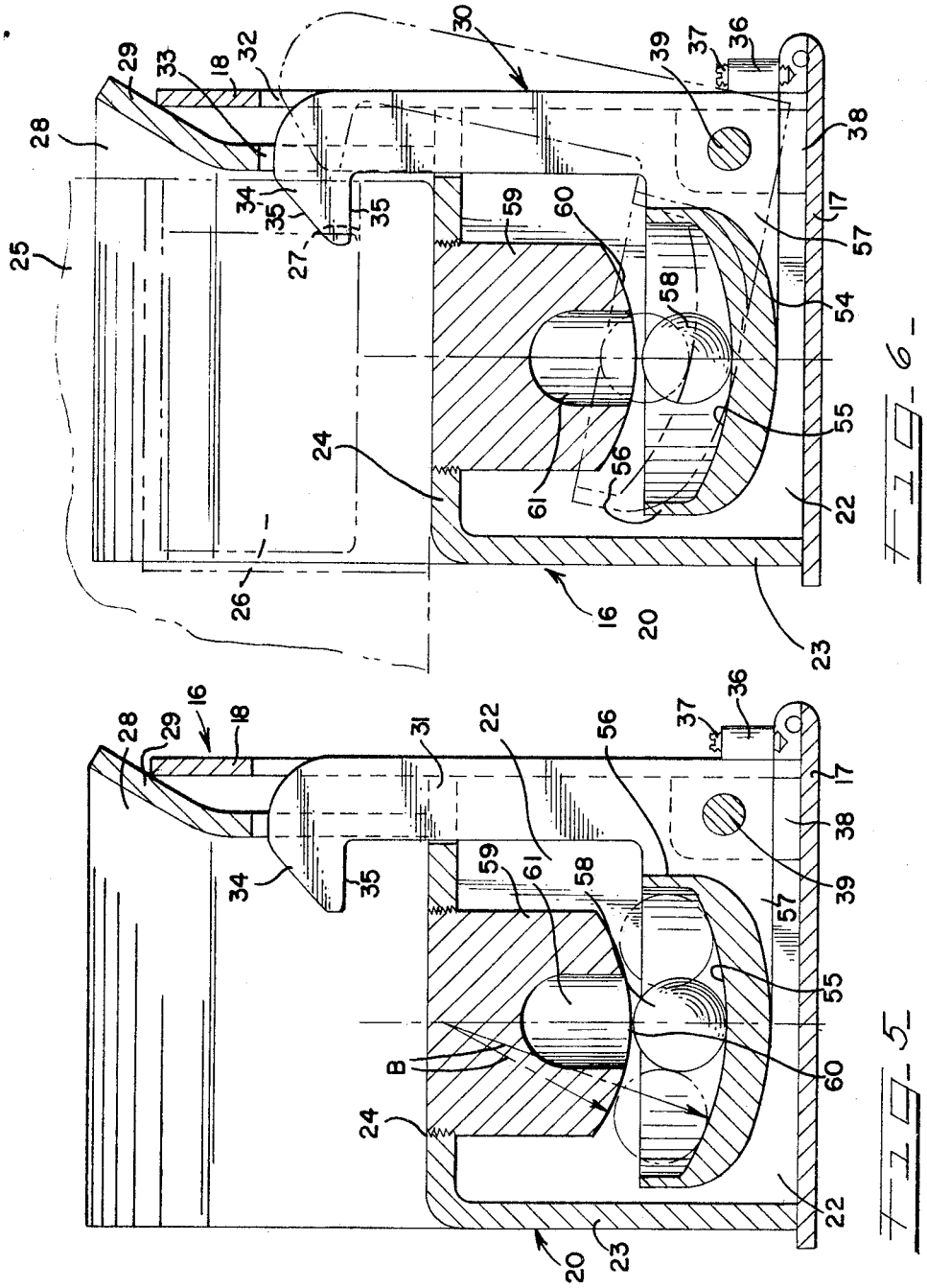
INVENTOR
JACK E. GUTRIDGE
BY Helmuth O. Vogel
ATT'Y.

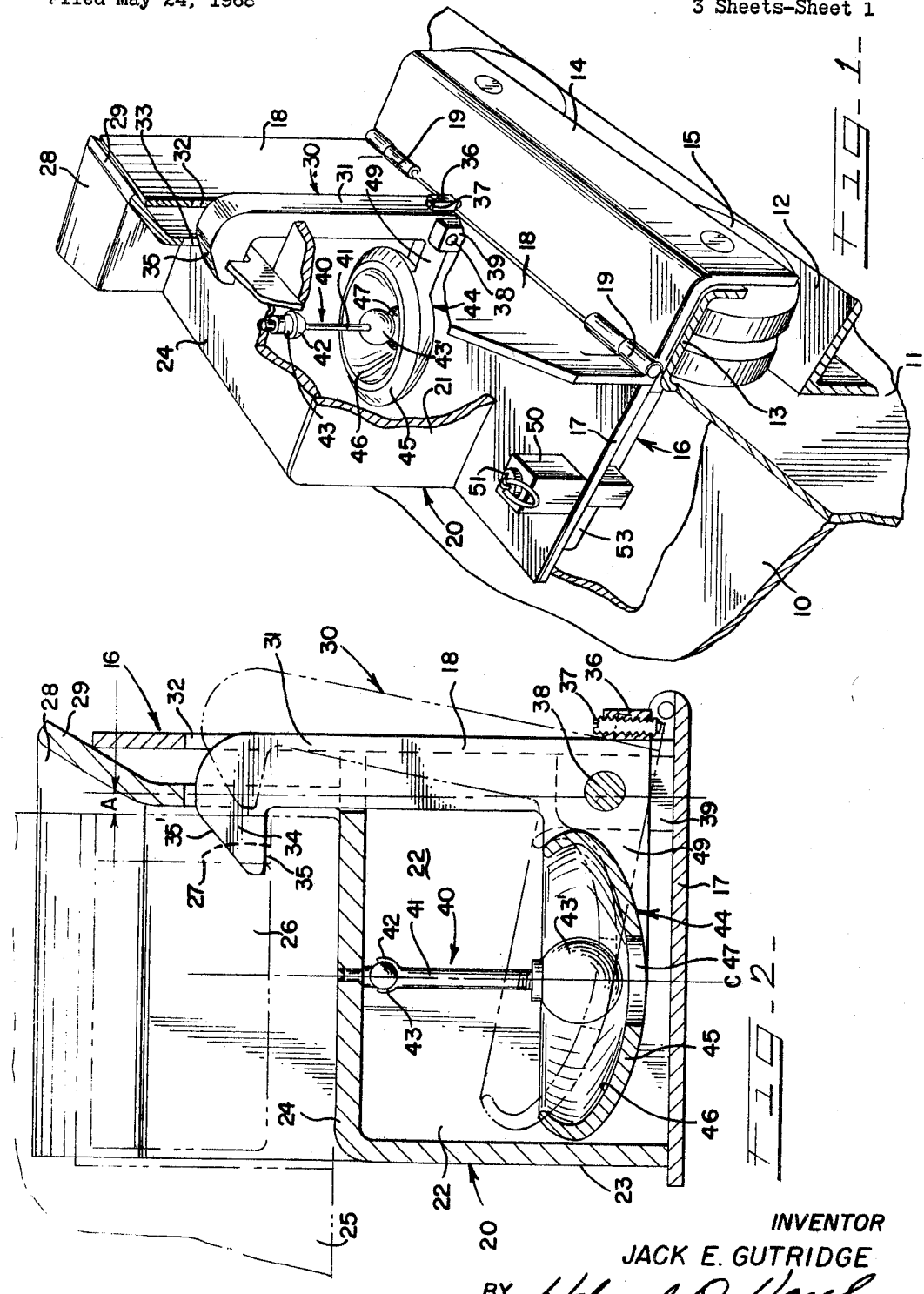

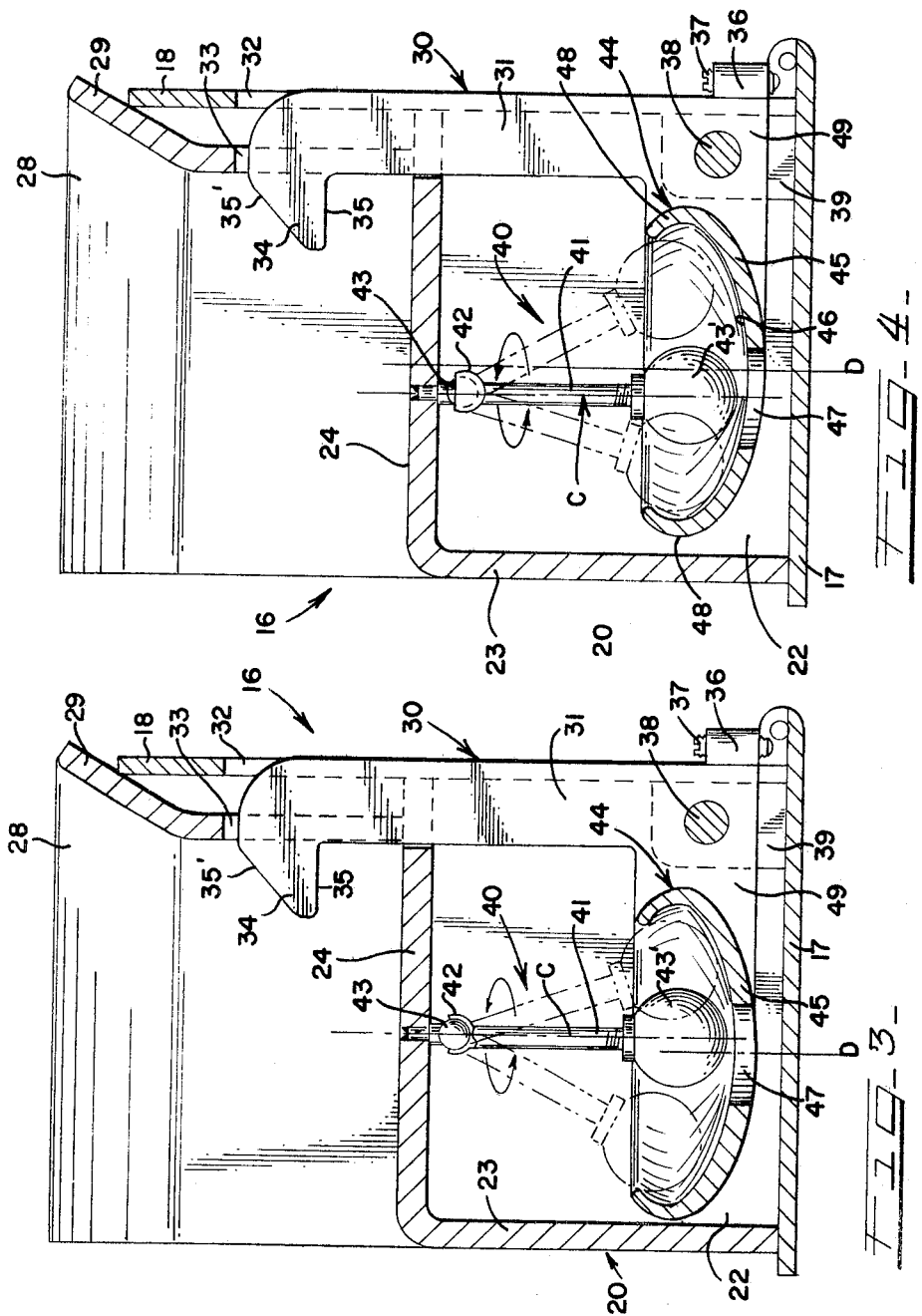

United States Patent Office 3,508,500
Patented Apr. 28, 1970

3,508,500
BRACKET ARRANGEMENT FOR SECURING CARGO CONTAINERS ON VEHICLES
Jack E. Gutridge, Dyer, Ind., assignor to Pullman Incorporated, Chicago, Ill., a corporation of Delaware
Filed May 24, 1968, Ser. No. 731,964
Int. Cl. B61d 45/00
U.S. Cl. 105—366                    15 Claims

ABSTRACT OF THE DISCLOSURE

A bracket arrangement for securing a cargo container on a vehicle having a platform on which the container is supported, the vehicle being subject to acceleration and deceleration forces and tilting of the platform during normal operation wherein latch means is provided to restrain the container against upward movement, the said latch means permitting normal unloading movement of the container when the vehicle is at rest, said latch means including means responsive to the acceleration and deceleration forces on the vehicle, and inclination of the platform, to lock said latch mechanism in engaged position with the container to prevent vertical displacement thereof.

BACKGROUND OF THE INVENTION

Field of the invention

This invention is concerned with transportation vehicles such as the over-the-highway trucks and trailers and also particularly railway flat cars which are adapted for container operation. The specific field is concerned with tiedown devices such as container brackets, one of which is generally positioned at the four corners of a container to restrain the same against horizontal and vertical movements relative to the vehicle.

Description of the prior art

The prior art discloses container brackets which are adapted to be supported on the platform of a vehicle and these include abutment means adapted to engage the sides of the container to prevent horizontal displacement relative to the platform. To prevent vertical displacement of the container during operation of the vehicle these brackets also generally include restraining elements in the form of sliding or pivoting elements which are supported on the brackets and are moved into mating or engaging position with openings provided in the corner brackets of the containers. In this position these elements are generally locked by suitable latching mechanisms which prevent any vertical displacement of the container during shipment. Such elements must generally be manually unlatched and withdrawn from the corner openings when the container reaches its destination and is to be unloaded from the platform. The present invention eliminates the manual unlocking of the bracket latching means when it is desired to move the cargo container from the platform.

SUMMARY

A bracket arrangement positioned on the platform of a vehicle for supporting the corner of a container against horizontal and vertical movements which includes a latching element that prevents vertical displacement of the container during certain operating conditions of the vehicle and which automatically moves to a disengaged position relative to the container when the container is lifted vertically for removal from the platform during unloading operations.

BRIEF DESCRIPTION OF THE DRAWINGS

FIG. 1 is a perspective view showing a portion of a platform of a vehicle having a container bracket arrangement supported thereon, the bracket arrangement having portions broken away to disclose pertinent parts of a latch mechanism;

FIG. 2 is a cross-sectional view through a container bracket arrangement shown in FIG. 1;

FIG. 3 is a cross-sectional view through a modified form of the container bracket arrangement shown in FIG. 2;

FIG. 4 is a cross-sectional view through another form of modified bracket arrangement;

FIG. 5 is a cross-sectional view through another modified form of container bracket arrangement; and FIG. 6 is a view similar to FIG. 5 showing the container bracket arrangement in several operative positions.

DESCRIPTION OF THS PREFERRED EMBODIMENT

The present invention is applicable to any vehicle for transporting containers. Referring now particularly to FIG. 1 a vehicle platform is designated by the reference character 10. The vehicle may be a railway car, a highway trailer, a truck, or any other transportation device which is adapted to support for transportation, cargo containing trailers. The platform 10 is provided at opposite sides thereof with side sills 11 having longitudinally extending angles 12, only one of which is shown, which are disposed beneath a horizontal flange 13 which with the angle 12 provides a track on each side of the platform 10. The track on each side of the vehicle platform 10 is adapted to support a wheeled carriage 14 which rolls along the track by means of rollers 15. A bracket arrangement is generally designated by the reference character 16. In the application and use of the bracket arrangement 16, four of such arrangements are provided for supporting each container which is carried on the vehicle platform 10. Each bracket arrangement 16 is disposed at a corner of the container for supporting the same. The general disposition of such bracket arrangements 16 on the platform 10 of a vehicle is not disclosed since it is conventional in the art for such bracket arrangements to support the four corners of a container. The wheeled carriages 14 permit the bracket arrangements 16 to be moved longitudinally relative to the platform 10 to accommodate containers of different lengths.

Each bracket arrangement 16 comprises a base 17 which is provided with an outer vertical wall 18, the said base 17 and wall 18 being suitably hinged to the wheeled carriage 14 as indicated by hinge brackets 19. Each bracket arrangement 16 includes a housing 20 provided with parallel walls 21 and 22 and a wall 23 parallel to the wall 18. The walls 18–21–22–23 support a horizontal load-supporting top wall 24 upon which the corner of a container 25 is seated as best shown in FIGS. 2 and 6. The corners of a container 25 are provided with container brackets 26 which are provided with a suitable opening 27. The openings 27 in the corner container brackets 26 are provided for securing the container 25 to the platform 10. Upwardly extending flanges or abutments 28 and 29 are provided on each bracket arrangement 16, these serving to restrain the container 25 against horizontal movement.

Each bracket arrangement 16 includes a latch member 30 which comprises a vertically extending arm 31 movable through a vertical slot 32 in the wall 17 and through a slot 33 provided in the abutment member 29. The upper end of the arm 31 is provided with an inwardly extending restraining hook 34 having a horizontal wall 35 engageable with the container bracket 26 through the opening 27, as best shown in FIGS. 2 and 6. The arm 31 also carries thereon a threaded boss 36 having supported therein a stop screw 37 which may be adjusted to project various distances from the lower end of the boss 36 to limit the angular movement outwardly of the arm 31, as best shown in FIG. 2. A hinge pin 38 extends through a split hinge bracket 39 and through the arm 31 whereby the same is hingedly mounted on the base 17.

As best shown in FIGS. 1 through 4, a motion responsive member is generally designated at 40. The motion responsive member 40 comprises a pendulum arm 41 in the form of a rod-like member which is provided at its upper end with a ball joint connecting element 42 adapted to swivel about a ball element 43 suitably suspended from the wall 24. The lower end of the pendulum arm 41 has connected thereto a weighted ball 43'. The ball 43' may be spherical, frusto-conical or of any suitable shape for the purpose which will be described below.

A stop member or horizontally extending stop is designated at 44 and comprises a dish-shaped element 45 having an arcuate inner surface 46 provided with an opening 47. A peripheral rim or flange 48 extends above the dish-shaped element 45 and the said stop 44 is suitably connected to the arm 31 by means of a horizontally extending stem 49. Thus the arm 31 and stop member 44 are disposed in L-shaped configuration with the stem 49 extending substantially normal to the arm 31.

The bracket arrangement 16 is suitably anchored in a longitudinal position on the platform 10 by means of a latch 50 having a pin 51 extending therethrough which includes a locking projection 52 adapted to engage slots 53 longitudinally spaced along the platform 10.

THE OPERATION

In the operation of the container bracket arrangement 16 shown in FIGS. 1 through 4, the container 25 is seated on the platform 10 with its four corners supported on the four top supporting walls 24 of each bracket arrangement 16. The abutments 28 and 29 of each bracket arrangement 16 serve to prevent horizontal shifting of the container 25 which may result from forces applied on the vehicle due to acceleration of the vehicle, deceleration of the vehicle, or positioning of the platform 10 in an inclined manner as, for example, that which could occur as the vehicle travels up an inclined roadway or railroad track. In the case of a railroad car, the car in addition to the accelerations and decelerations which are normal to train operation is subjected to impacts arising out of coupling of cars during train make-up which is generally practiced in classification yards. Such impacts cause a relatively hard blow on the end of the car which is transmitted to the cargo contained within the container 25. The horizontal shifting of the container 25 relative to the platform 10 thus is prevented by the abutments 28 and 29.

The latch 30 of each bracket arrangement 16 is designed to prevent the container 25 from vertical movement. In the engaging position of the arm 31, the hook-shaped member 34 is disposed within the container bracket 26 with the surface 35 engaging the lower portion of the opening 27 to firmly maintain the container 25 on its supporting surface 24. The letter A in FIG. 2 denotes the distance from the side of the container 25 to the centerline of the hinge pin 38 which is thus offset from the side of the container 25. During upward unloading movement of the container 25, by means of a crane or other suitable mechanism, an upward sustaining force is applied to the surface 35 which urges the latch element 30 to tilt to the position indicated in FIG. 2 so that the container 25 is released automatically as it is moved upwardly. The offset relation of the hinge pin 38 as indicated at A permits the sustaining force to pivot the arm 31 to its disengaged position. Since the vehicle is at rest the pendulum 40 is in an inert position as shown in FIG. 2 and the relative movement of the dish-shaped member 45 causes the opening 47 to move over the ball 43' which does not function at this point in any restraining manner. The ball 43' may also be tapered, or of other type construction, permitting the opening 47 to easily pass over the end of the ball 43' in the operation of unloading. Thus when the vehicle is at rest and is on a horizontal surface so that the platform 10 is not inclined any sustained upward pull on the container to lift the same upwardly will cause the arm 31 to move to the dotted line position shown in FIG. 2. The container then can easily be removed from the platform.

In train operation accelerations, decelerations, and movement of the platform to a position inclined from the horizontal will cause the pendulum 40 to assume the positions shown in FIGS. 3 and 4 wherein the ball 43' is now in a position away from the opening 47 and is adapted to engage the arcuate wall 46 to thus act as a stop or restraining means preventing pivoting movement of the arm 31 from its locked position. Thus the ball 43' is motion responsive to the accelerations, decelerations, and the inclined position of the platform 10 whereby under these conditions a positive locking means is provided to retain the arm 31 in its engaged position with the container corner bracket 26.

While an upward sustained pull on the container 25 will cause the arm 31 to pivot to a release position when the pendulum 40 is in an inert position, the arm 31 will not move to a release position during normal forces tending to move the container upward, such as might be occasioned by a smooth, constant speed operation on the highway or on the railway track. However, any sudden deceleration, acceleration, or inclination which might generate sufficient forces to cause movement of the arm 31 to its release position are immediately resisted by the position of the pendulum 40 which is then in its locking or stopping position relative to the stop 44 and dish-shaped element 45.

In FIG. 3 a modified form of the invention is disclosed. The centerline C of the pendulum 40 is offset to the right with respect to the centerline D of the dish-shaped element 45. In FIG. 4 the centerline C of the pendulum 40 is offset to the left of the centerline D through the dish-shaped member 45. In the embodiment shown in FIG. 2, movement of the pendulum 40 will be in a straight direction and will return or rebound along the same path. In other words, if the centerline of the pendulum 40 is the same as the centerline of the dish-shaped element 45 the pendulum 40 moves in a straight direction and bounces back in a straight manner. On the other hand, if the pendulum centerline C is offset as shown in FIGS. 3 and 4 the motion of the pendulum 40 will be in one direction and then is deflected arcuately in another direction. Thus the action of the pendulum 40 can be controlled as desired. The principle in all embodiments however remains the same in that under certain force conditions and inclination of the platform 10 the pendulum 40 is moved into a stop position relative to the movement of the dish-shaped element 45 to restrain movement of the arm 31 out of its locked engagement with the container. The size and shape of the pendulum 40 can of course be varied for the particular action desired. The vertical arm 31 also is biased by means of the dish-shaped element 45 to its closed position within the container corner lock. The surface 35' being tapered in the manner shown permits the arm 31 also to be moved outwardly during loading of the container. As the container is placed downwardly it engages the surface 35' and pushes the arm 31 outwardly, the arm then returning into the container corner bracket opening 27 after it has been seated on the surface 24.

In FIGS. 5 and 6, another modification of the invention has been shown. In these views, parts which are the same as the embodiment shown in FIGS. 1 through 4 contain the same reference characters. The arm 31 in FIGS. 5 and 6 is connected to a dish-shaped stop element 54 having a concave surface 55 and a peripheral flange or rim 56. The element 54 is connected by a stem 57 to the arm 31 in the same manner shown in the other embodiments. A spherical member such as a ball 58 is free to roll on the concave surface 55. The dish-shaped element 54 is positioned below a second stop member 59 supported from the wall 24. The stop member 59 includes a convex surface 60 which is spaced from the concave surface 55 and conforms in shape thereto. Radius lines B in FIG. 5 denote that they extend from the same point along the centerline of the stop member 59. The vertical distance between the surfaces 55 and 60 is only slightly more than the diameter of the ball 58. The stop member 59 also includes an upwardly extending recess 61 centrally disposed relative to the dish-shaped element 54.

The operation of the latch mechanism 30 is substantially identical to that shown in FIGS. 1 through 4 and need not be further described. The ball 58 is a free-rolling ball and is however motion responsive similar to the pendulum 40 shown in the aforementioned figures. As the ball 58 moves in response to accelerations and decelerations of the vehicle and to an inclined position of the platform 10 from horizontal, the ball 58 is held between the surfaces 55 and 60 to stop movement of the arm 31 and thus the latch mechanism 30 is locked to prevent upward lifting movement of the container 25 under these conditions. In the dotted line position shown in FIG. 6, the ball 58 is moved from its inert position into the recess 61 thus permitting the latch 30 to become unlocked when the container 25 is lifted upwardly during a sustained pull necessary to remove the container during unloading procedure.

What is claimed is:

1. A container bracket arrangement for securing a cargo container supported on the platform of a vehicle comprising:

abutment means on said platform adapted to engage and restrain a container against longitudinal and lateral movement relative to said vehicle resulting from horizontal acceleration and deceleration forces applied to said vehicle, a latch means movably supported on said vehicle relative to said platform, said latch means including restraining means engageable with the container for restraining the same against upward movement relative to said vehicle, said latch and restraining means being responsive to upward movement of said container during unloading of said container from said vehicle to move to a release position, permitting removal of said container, and movable means associated with said latch means responsive to acceleration and deceleration forces on said vericle, and positions of said platform inclined from the horizontal, to lock said restraining means in said engaging relation with respect to said container.

2. A container bracket arrangement for securing a cargo container supported on the platform of a vehicle comprising:

a latch means movably supported on said vehicle relative to said platform, said latch means including restraining means engageable with the container for restraining the same against upward movement relative to said vehicle, said latch and restraining means being responsive to upward movement of said container during unloading of said container from said vehicle to move to a release position, permitting removal of said container, and movable means associated with said latch means responsive to acceleration and deceleration forces on said vehicle, and positions of said platform inclined from the horizontal to lock said restraining means in said engaging relation with respect to said container.

3. The invention in accordance with claim 1, said movable responsive means including a pendulum suspended on said vehicle which during swinging movement blocks movement of said latch means.

4. The invention in accordance with claim 1, said movable responsive means during nonmovement of said vehicle being in an inert position out of the path of movement of said latch means, and during movement of said vehicle being adapted to block movement of said latch means.

5. The invention in accordance with claim 1, said latch means comprising a vertical arm including pivot means for supporting the same on said vehicle, said vertical arm projecting upwardly from said platform, said restraining means including an element on said vertical arm adapted to project horizontally into the opening of a bracket on said container in said lock position, said movable responsive means comprising a pendulum having a rod-like element swingably suspended on said vehicle, said rod-like element being disposed in a substantially vertical inert position during the absence of acceleration and deceleration forces, and in a noninclined position of said platform, a stop member connected to said vertical arm and extending laterally with respect thereto, said stop member having a surface extending transversely and longitudinally relative to said vehicle, said surface having an opening therein which in the substantially inert position of said pendulum and in the engaging position of said restraining means is disposed below said rod-like element with said opening being adapted to move over an end of said rod-like element during pivotal movement of said arm whereby during upward unloading movement of said container said restraining means is released from said lock position, said end of said rod-like element during acceleration and deceleration forces on said vehicle and in the inclined position of said platform being swingable to a position in engagement with said stop surface to prevent pivotal movement of said arm and maintain said restraining means in said lock position.

6. The invention in accordance with claim 5, said stop member having a dish-shaped configuration.

7. The invention in accordance with claim 6, said surface being of concave shape and including a peripheral rim for limiting the swinging movement of said rod-like element.

8. The invention in accordance with claim 7, said end of said rod-like element having a generally spherical member connected thereto.

9. The invention in accordance with claim 5, wherein a vertical plane through said pivot means is disposed laterally outwardly of a vertical side of said container.

10. The invention in accordance with claim 5, wherein a vertical centerline through said rod-like element and a vertical centerline through said stop member are concentric.

11. The invention in accordance with claim 4, wherein a vertical centerline through said rod-like element and a vertical centerline through said stop member are laterally offset with respect to each other.

12. A container bracket arrangement for securing a cargo container supported on the platform of a vehicle comprising:

a latch element including an upright arm pivotally supported on said vehicle and projecting upwardly from said platform, said arm having a restraining means adapted to project into an opening in the container and in a locked position restrain the container against upward movement from said platform, a stop member connected to and projecting laterally from said arm, said stop member having a concave surface, a second stop member supported on said vehicle above said first stop member, said second stop member having a convex surface conforming generally to said concave surface and being vertically spaced with respect thereto, a spherical motion responsive member retained on said concave surface being movable from an inert position in response to acceleration and deceleration forces and positions of said vehicle inclined from the horizontal, said second stop member having a vertical opening in said convex surface and being substantially in vertical alignment with said motion responsive member in the inert position whereby during upward unloading movement of said container said arm is pivoted out of restraining engagement with said container and said motion responsive member is moved in registry with said opening, said motion responsive member being movable in response to said forces and positions of said vehicle between said concave and convex surfaces restraining pivotal movement of said arm thereby maintaining said arm in the locked position.

13. The invention in accordance with claim 12, including abutment means on said platform engageable with said container to restrain the same against lateral and longitudinal movement relative to said platform.

14. The invention in accordance with claim 13, said first stop member being of dish-shape and having a peripheral flange to retain said spherical member on said concave surface.

15. The invention in accordance with claim 14, said vertical distance between said concave and convex surfaces being sufficient only to permit free rolling movement of said motion responsive member.

References Cited

UNITED STATES PATENTS

| | | | |
|---|---|---|---|
| 1,471,111 | 10/1923 | Eder | 105—366 |
| 1,966,492 | 7/1934 | Fildes | 105—366 |
| 2,424,429 | 7/1947 | Bamberg | 105—366 |
| 3,399,921 | 9/1968 | Trost et al. | 296—35 |

DRAYTON E. HOFFMAN, Primary Examiner

U.S. Cl. X.R.

248—361